US010432008B2

(12) United States Patent
Sporck et al.

(10) Patent No.: US 10,432,008 B2
(45) Date of Patent: *Oct. 1, 2019

(54) SYSTEMS AND METHODS FOR CHARGING A BATTERY

(71) Applicant: QUALCOMM Incorporated, San Diego, CA (US)

(72) Inventors: Christian Sporck, Campbell, CA (US); VaraPrasad Arikatla, San Jose, CA (US); Shadi Hawawini, Mountain View, CA (US); Steve Hawley, Emerald Hills, CA (US); Thomas O'Brien, Powell, OH (US); Seema Kumar, Milpitas, CA (US); Aaron Melgar, San Martin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,684

(22) Filed: Aug. 28, 2017

(65) Prior Publication Data
US 2018/0013295 A1 Jan. 11, 2018

Related U.S. Application Data

(63) Continuation of application No. 14/856,947, filed on Sep. 17, 2015, now Pat. No. 9,748,788.

(51) Int. Cl.
*H02J 7/00* (2006.01)
*H02J 7/02* (2016.01)
(Continued)

(52) U.S. Cl.
CPC ............... *H02J 7/007* (2013.01); *H02J 7/00* (2013.01); *H02J 7/008* (2013.01); *H02J 7/0052* (2013.01);
(Continued)

(58) Field of Classification Search
CPC .. H02J 2007/0062; H02J 7/0052; H02J 7/007; H02J 7/0055; H02J 7/008;
(Continued)

(56) References Cited

U.S. PATENT DOCUMENTS 5,914,710 A * 6/1999 Chen ...................... G06F 3/046
178/19.04
7,161,393 B1 1/2007 Potanin et al.
(Continued)

FOREIGN PATENT DOCUMENTS

CN 104600813 A 5/2015
EP 1821384 A2 8/2007

OTHER PUBLICATIONS

Wong S., "Dynamic Power Management for Faster, More Efficient Battery Charging," Analog Applications Journal, High-Performance Analog Products, Texas Instruments Incorporated, 2013, pp. 15-18.
(Continued)

Primary Examiner — Vuthe Siek
(74) Attorney, Agent, or Firm — Haynes and Boone (36340)

(57) ABSTRACT

The present disclosure includes a method of charging a battery. In one embodiment, the method comprises receiving, in a battery charging circuit on an electronic device, an input voltage having a first voltage value from an external power source. The battery charger is configured to produce a charge current having a first current value into the battery. The input current limit and/or duty cycle of the charger is monitored. Control signals may be generated to increase the first voltage value of the input voltage if either (i) the input current limit is activated or (ii) the duty cycle reaches a maximum duty cycle. The charger also receives signals indicating a temperature inside the electronic device and generates control signals to decrease the value of the input
(Continued)

voltage when the temperature increases above a threshold temperature.

17 Claims, 13 Drawing Sheets

(51) Int. Cl.
    *H02M 3/156*     (2006.01)
    *H02J 7/04*     (2006.01)

(52) U.S. Cl.
    CPC .......... *H02J 7/0055* (2013.01); *H02J 7/0091* (2013.01); *H02J 7/0093* (2013.01); *H02J 7/022* (2013.01); *H02J 7/047* (2013.01); *H02J 2007/0059* (2013.01); *H02J 2007/0062* (2013.01); *H02M 3/156* (2013.01)

(58) Field of Classification Search
    CPC .. H02J 7/0091; H02J 7/022; H02J 2007/0059; H02J 7/00; H02J 7/02; H02J 7/0093; H02J 7/047; H02M 3/156
    See application file for complete search history.

(56) References Cited

U.S. PATENT DOCUMENTS

| | | | |
|---|---|---|---|
| 7,834,591 | B2 | 11/2010 | Hussain et al. |
| 7,990,106 | B2 | 8/2011 | Hussain et al. |
| 8,952,823 | B2 | 2/2015 | Xie et al. |
| 9,748,788 | B2* | 8/2017 | Sporck .................... H02J 7/007 |
| 2004/0113585 | A1 | 6/2004 | Stanesti et al. |
| 2004/0232892 | A1* | 11/2004 | Aradachi .............. H02J 7/0068 |
| | | | 320/150 |
| 2005/0226013 | A1* | 10/2005 | Fontana .................... H02J 1/00 |
| | | | 363/65 |
| 2008/0054855 | A1 | 3/2008 | Hussain et al. |
| 2009/0015207 | A1 | 1/2009 | Ibrahim |
| 2009/0121684 | A1 | 5/2009 | Hussain et al. |
| 2012/0217935 | A1 | 8/2012 | Hawawini et al. |
| 2014/0097814 | A1 | 4/2014 | Brewster |
| 2014/0117944 | A1 | 5/2014 | O'Brien et al. |
| 2014/0122909 | A1 | 5/2014 | Hawawini et al. |
| 2014/0184173 | A1 | 7/2014 | Szepesi |
| 2014/0217958 | A1 | 8/2014 | Verdun et al. |
| 2015/0035504 | A1 | 2/2015 | Lyle, Jr. |
| 2015/0229155 | A1 | 8/2015 | Sporck et al. |
| 2016/0028249 | A1 | 1/2016 | Tokutake |
| 2016/0043634 | A1* | 2/2016 | Bemat ................. H02M 1/4225 |
| | | | 713/300 |
| 2016/0233713 | A1 | 8/2016 | Cheng |
| 2017/0085098 | A1 | 3/2017 | Sporck et al. |

OTHER PUBLICATIONS

International Search Report and Written Opinion by the International Searching Authority for PCT/US2016/049130, dated Nov. 9, 2016, 10 pages.

* cited by examiner

KEY TO

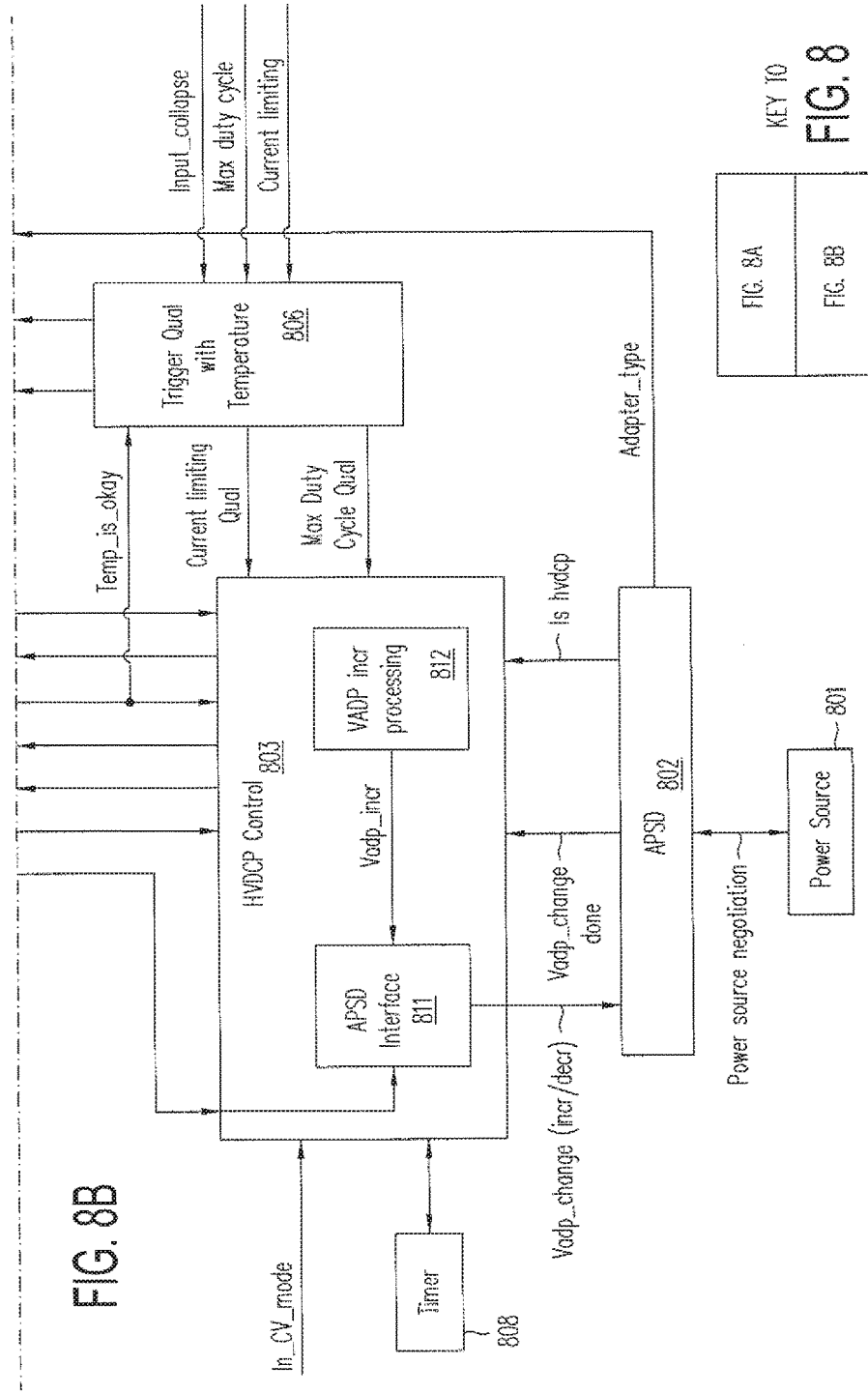

SYSTEMS AND METHODS FOR CHARGING A BATTERY

RELATED APPLICATIONS

The present application is a continuation application of U.S. Utility patent application Ser. No. 14/856,947, entitled "SYSTEMS AND METHODS FOR CHARGING A BATTERY" filed Sep. 17, 2015, which is incorporated by reference herein in its entirety.

BACKGROUND

The present disclosure relates to electronic circuits, systems and apparatuses, and in particular, to systems and methods for charging a battery.

Many modern electronic systems rely on one or more batteries for power. The batteries are typically recharged by connecting the system to a power source (e.g., an alternating current (AC) power outlet) via an AC-DC power adapter and cable, for example. FIG. 1 illustrates battery charging in a typical electronic device. In this example, a power adapter 102, such as an AC-DC converter, is connected to a power source 101. Power adapter 102 may provide a direct current (DC) voltage and current to electronic device 103 via a cable 120. Voltage and current from power adapter 102 are received by a power interface, such as a power management integrated circuit (PMIC), which may convert the voltage and current from adapter 101 to different voltages and currents to drive various system components, such as one or more processors 111, communications electronics (e.g., radio frequency (RF) transceivers) 112, and one or more input/output devices 113, such as a touch screen display our audio system, for example. When disconnected from an external power source, power interface 110 may receive voltage and current from battery 114 to power the internal components, for example.

Power interface 110 may include a battery charging circuit 115 for charging battery 114 when the battery is discharged. One problem associated with battery chargers is power dissipation. Cable 120 may include resistance leading to thermal power dissipation as well as a reduction of the input voltage from the power adapter. Accordingly, the voltage at the input of the battery charger may be less than the voltage at the output of the power adapter due to current in the cable 120. To reduce this voltage drop, some systems may use higher adapter voltages, which will effectively reduce the amount of current required to achieve the same power level. However, higher adapter voltages can cause larger power dissipation in battery charger circuitry. For example, higher voltages across switching transistors in the battery charger may cause increases in power dissipation during charging due to increased switching losses every turn-on/off cycle. Additionally, higher input voltages can cause increased current ripple in a battery charger's inductor(s), which can result in higher conduction losses and core losses, for example. Therefore, being able to optimize power dissipation during the battery charging process is an ongoing challenge for battery operated systems.

SUMMARY

The present disclosure pertains to systems and methods for charging a battery. In one embodiment, a method comprises receiving, in a battery charging circuit on an electronic device, an input voltage having a first voltage value from an external power source. The battery charger is configured to produce a charge current having a first current value into the battery. The input current limit and/or duty cycle of the charger is monitored. Control signals may be generated to increase the first voltage value of the input voltage if either (i) the input current limit is activated or (ii) the duty cycle reaches a maximum duty cycle. The charger also receives signals indicating a temperature inside the electronic device and generates control signals to decrease the value of the input voltage when the temperature increases above a threshold temperature. Conversely, the same control signal can be used to decrement the input voltage when the temperature decreases below a temperature threshold.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Features and advantages of the present disclosure include battery charging systems and methods that may optimize power delivery from an external power source to a battery by modifying input voltage and battery charge current (or input current) based on a variety of operational charging parameters including, but not limited to, temperature, duty cycle, and current limiting, for example.

Figure 1:
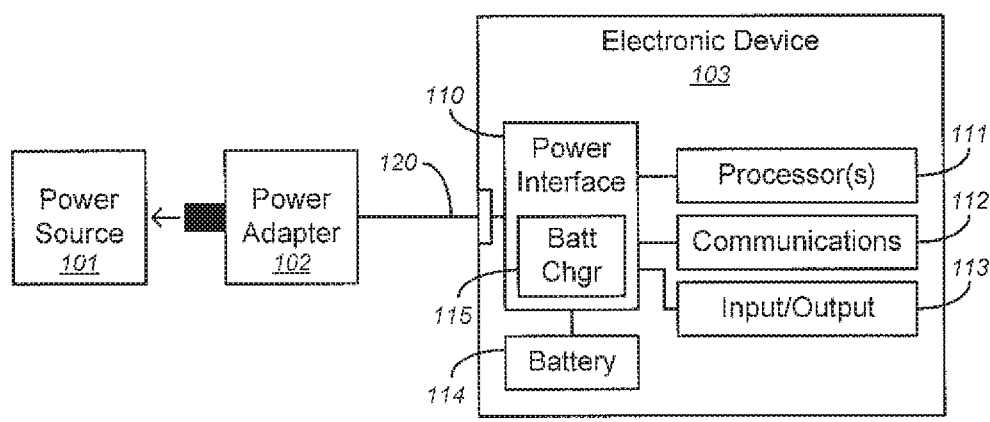
FIG. 1 illustrates battery charging in a typical electronic device.
Figure 2:
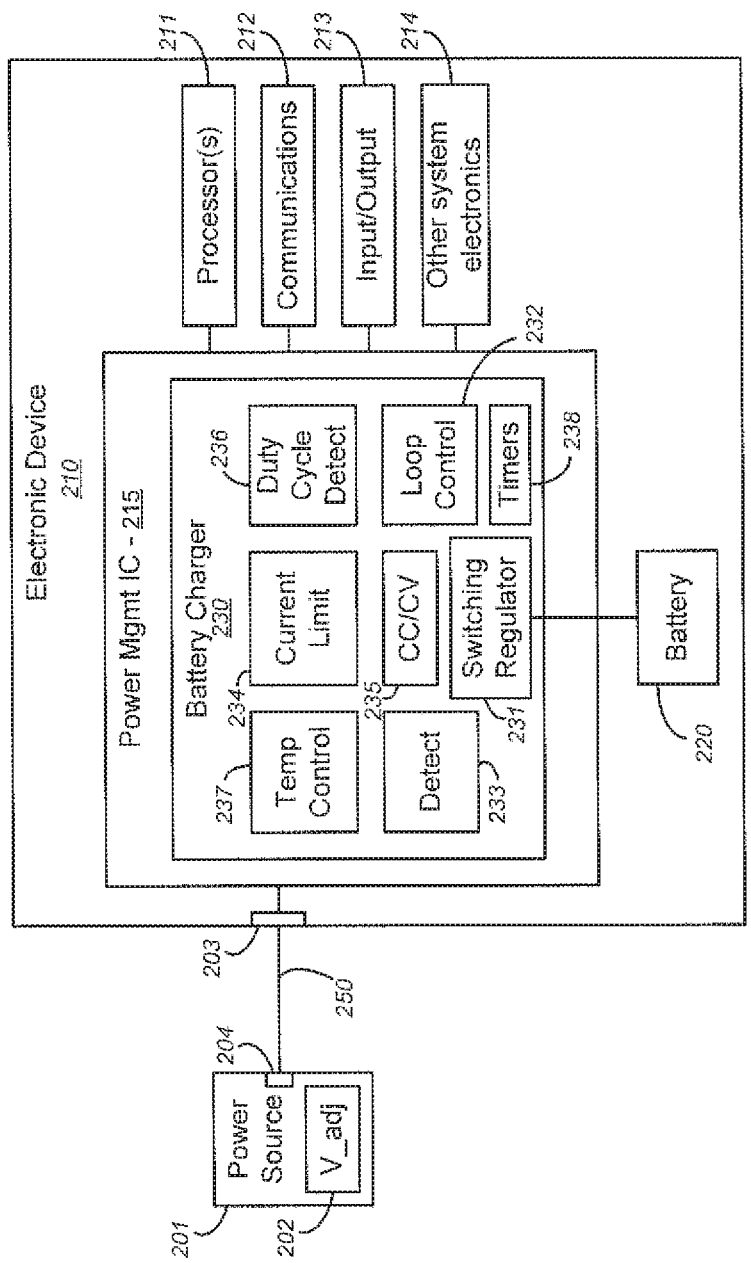
FIG. 2 illustrates an electronic device with a battery charging system according to an embodiment.

FIG. 2 illustrates an electronic device with a battery charging system according to an embodiment. Electronic device 210 may include a rechargeable battery 220. Battery 220 may provide power to various internal circuits such as one or more processors 211, communications circuits 212 (e.g., RF communications such as Wifi, cellular, Bluetooth, and global positioning systems (GPS)), input/output circuits 213 such as displays (e.g., touch screens), audio inputs and outputs and haptics, and various other system electronics 214, for example. Embodiments of electronic device 210 may include a cellular phone (e.g., a smart phone), tablet computer, or other battery operated electronic devices as small as a watch or biometric sensor (e.g., a fitness electronic device) to larger devices (systems) operating off one or more rechargeable batteries.

In some situations, electronic device 210 may receive power from an external power source 201. For example, an external power source 201 may be coupled to electronic device 210 over one or more electrically conductive wires 250 (e.g. cable), which may plug into connectors 203 and 204, for example. External power sources according to certain embodiments may be configured to produce a plurality of different voltage values in response to control signals using voltage adjust circuitry 202 (V_adj). Example external power sources include AC wall adapters (wall chargers) or Universal Serial Bus (USB) ports, which may produce different voltages at the input of the electronic device in response to control signals received over one or more wires 250. For example, one technique for causing an AC wall adapter to produce different voltages is known as Quick Charge 2.0™ from Qualcomm® which may configure an AC wall adapter to produce output voltages of 5 volts, 9 volts, 12 volts, and 20 volts, for example, in response to control signals communicated over a cable between the electronic device and the wall adapter. Another technique for causing an AC wall adapter to produce different voltages is known as Quick Charge 3.0™ from Qualcomm® which may configure an AC wall adapter to produce multiple different output voltages that can change in as little as 200 mV steps, for example, in response to control signals communicated over a cable between the electronic device and the wall adapter. Some USB ports may also support producing different voltages in response to control signals received from an electronic device, including USB ports supporting USB Power Delivery over USB type-C cables, for example. The above example external power sources are only example applications of the techniques described herein, which may have applications beyond such systems.

When external power source 201 is coupled to electronic device 210 an input voltage (Vin) is received by a battery charging circuit 230. Initially, input voltage Vin may have a first voltage value (e.g., 5 v). Embodiments of the present disclosure include configuring battery charging circuit 230 to produce (e.g., supply and regulate) a particular charge current (e.g., a desired charge current) into battery 220 or regulate the battery voltage. However, some external power sources may not be able to exceed a particular maximum desired output power to charge the battery. Thus, if the initial input voltage value and charge current value, for example, exceed the capabilities of the external power source, the desired charge current may not be obtained. Additionally, current from the external power source may cause a voltage drop across the cable, which may reduce the input voltage value. If the input voltage value is too low due to the resistive drop to support proper charging, the charge current may have to be reduced to reduce the input current and therefore increase the input voltage. Furthermore, if the desired charge current and voltage are obtained, the electronic device may heat up beyond allowable thermal tolerances. Accordingly, in one aspect, temperature inside the electronic device as well as an input current limit in the battery charging circuit and/or duty cycle may be monitored and used to control the voltage and current received from the external power source to optimize battery charging, for example.

As illustrated in FIG. 2, a battery charging circuit 230 may be part of a power management integrated circuit 215 (PMIC), for example. In some embodiments, battery charging circuits may alternatively be stand-alone systems. In this example, battery charging circuit 230 includes a switching regulator 231 and loop control circuits 232. Switching regulator 231 may be a Buck regulator, for example, where Vin is greater than Vout. Loop control circuits 232 may control the switching regulator to produce (e.g., regulate) output voltage or current to the battery, for example. Battery charging circuit 230 further includes detection circuits 233, current limit circuits 234, controlled current mode charging and controlled voltage mode charging circuits (CC/CV) 235, duty cycle detection circuits 236, temperature control circuits 237, and timers 238, for example. Detection circuits may be used to detect voltages and/or currents (e.g., input voltage and/or input current). Example detection circuits that may be used in certain embodiments are described in more detail below. Current limit circuits 234 may sense current (e.g., input current) and implement input current limiting. For example, when the value of the input current exceeds a particular current limit (e.g., which may be programmable), the current limit circuit may activate and control the switching regulator to maintain the input current at a particular input current limit value. Current control charging and voltage control charging circuits (CC/CV) 235 may be used to configure the switching regulator to perform controlled current charging (e.g., constant current) or controlled voltage charging (e.g., constant voltage). In some embodiments, loop control circuitry may include a pulse width modulator having an input coupled to multiple control loops, including a input current limit control loop, current control loop, and voltage control loop (e.g., arranged as a wired OR), so that the battery charger may be configured to charge the battery using different control parameters, for example. Duty cycle detection circuits 236 may monitor the duty cycle. As described in more detail below, when the duty cycle is at a maximum duty cycle, duty cycle detection circuits may be used to reconfigure the charging parameters to optimize charging. Temperature control circuits 237 may include temperature monitors and control circuitry. As described below, temperature detectors may be on the same integrated circuit die or external to the die to measure skin (e.g., surface) temperature, for example. Temperature control circuits 237 may include digital circuits that receive an indication that a temperature has exceeded one or more threshold temperatures. As described below, the system may be reconfigured based on temperature to optimize charging. Timers 238 may be used to control the timing of various charging operations as described further below.

Figure 3:
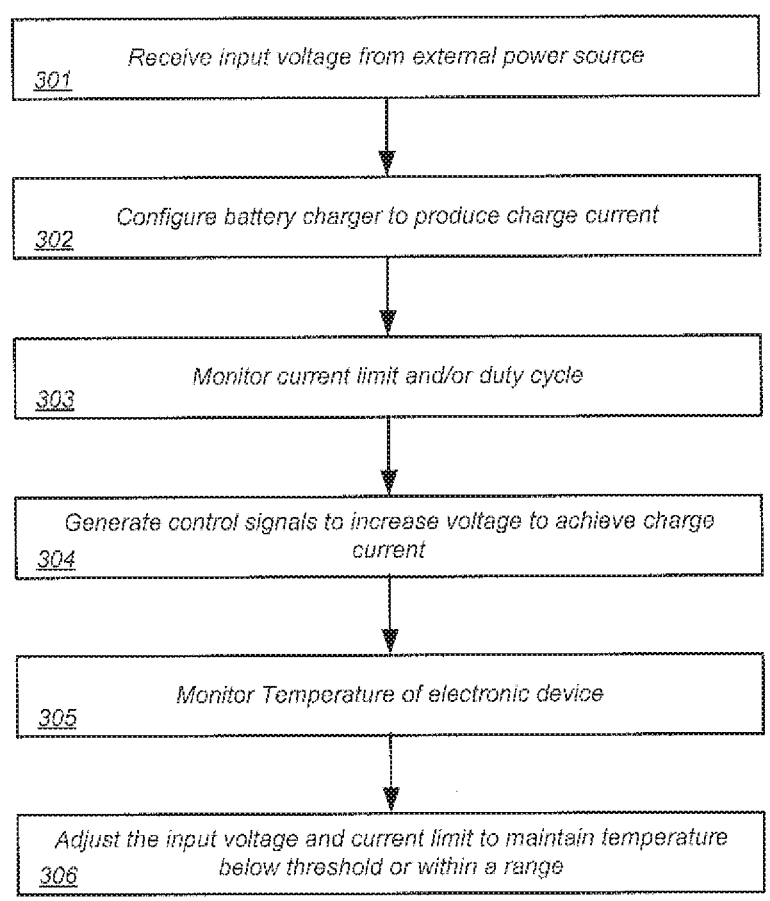
FIG. 3 illustrates a method of charging a battery according to an embodiment.

FIG. 3 illustrates a method of charging a battery according to an embodiment. In one embodiment, an input voltage is received in a battery charging circuit on an electronic device from an external power source as shown at 301. The input voltage may have a particular initial voltage value (e.g., 5 v). At 302, the battery charging circuit is configured to produce a charge current (Ichg) having a particular current value (e.g., 3 Amps) into the battery. In some instances, the configured charge current may be a desired charge current, and such current may exceed the capabilities of the external power source. For example, an external power source may be limited to 5 W, but to charge a battery at 3 Amps may require 15 W from the supply. Alternatively, resistance in the cable at high currents may cause a voltage drop between the output of the external power source (e.g., at connector 204) and the input of the battery charger (e.g., at connector 203). Accordingly, optimal battery charging in this configuration may not be able to occur. Embodiments of the present disclosure may monitor internal system parameters, such as input current limit and/or duty cycle, to detect conditions where battery charging is suboptimal.

For example, in one embodiment, battery charging circuit monitors input current limit, duty cycle, or both at 303. For instance, as described in more detail below, certain embodiments may determine a maximum current capability of the external power source to set the input current limit. If the maximum input current is reached, the input current limit circuit is activated (e.g., the switching regulator may be controlled to maintain the input current below a preset maximum input current limit value). In this case, it may be desirable to increase the input voltage from the external power sources to increase the input power to the battery charger, for example, to achieve the desired charge current. For example, although the external power source may not reach a higher output power at a higher output voltage, the required output current will be less to achieve the same output power. This will effectively overcome cable and PCB trace IR drops, which will deliver higher power at the input of the battery charger circuit. Alternatively, if the input voltage drops to a level close to the output voltage (e.g., due to resistive drops in the cable), the duty cycle may increase. For example, duty cycle in a Buck switching regulator is: Duty Cycle=Vout/Vin. Accordingly, if the input voltage is too low, the duty cycle may reach a maximum duty cycle, and the system may not be able to produce the desired charge current. Accordingly, it may be desirable to increase the input voltage from the external power sources to increase Vin and increase the charge current to desired levels, for example. Therefore, at 304, the battery charger may generate control signals (e.g., to the external power source) to increase the first voltage value of the input voltage to at least one second voltage value if either (i) the input current limit is activated or (ii) the duty cycle reaches a maximum duty cycle, for example. In one embodiment, the battery charger may generate control signals to successively increase the input voltage across a plurality of voltage values until a desired charge current is obtained. For example, in the case of Quick Charge 2.0™, the battery charger may successively increase Vin from 5 v to 9 v, and then to 12 v to produce the desired charge current. In the case of Quick Charge 3.0™, the battery charger may successively increase Vin above 5 v in 200 mV steps until either the current limit and/or the duty cycle indicate that the desired charge current is being produced, for example.

At 305, the battery charger may monitor temperature at various locations of the electronic device. As illustrated in example below, temperature may be sensed at one location or multiple different physical locations. For instance, a temperature sensor may be placed external to the PMIC to sense a skin temperature of the electronic device. An external temperature sensor positioned to sense skin (e.g., external case) temperature may generate a signal indicating that the skin temperature has exceeded one or more predefined threshold temperatures, each of which may be programmable, for example. Similarly, a temperature sensor may be implemented on the same substrate as PMIC to sense a die temperature of the PMIC (or on the die of another device). A temperature sensor positioned to sense die temperature may similarly generate a signal indicating that the die temperature has exceeded a predefined threshold temperature, which may also be programmable, for example. In one embodiment, sensing the temperature inside the electronic device comprises a logical OR of a skin temperature signal and a die temperature signal so that the system is regulated within safe operating ranges for both external temperature requirements and limits of the integrated circuits. Embodiments of the present disclosure may adjust the input voltage and current limit to maintain temperature below a threshold temperature or within a particular temperature range at 306. As illustrated below, example implementations may use multiple temperature readings to activate different charging procedures to optimize charging based on temperature.

Figure 4A:
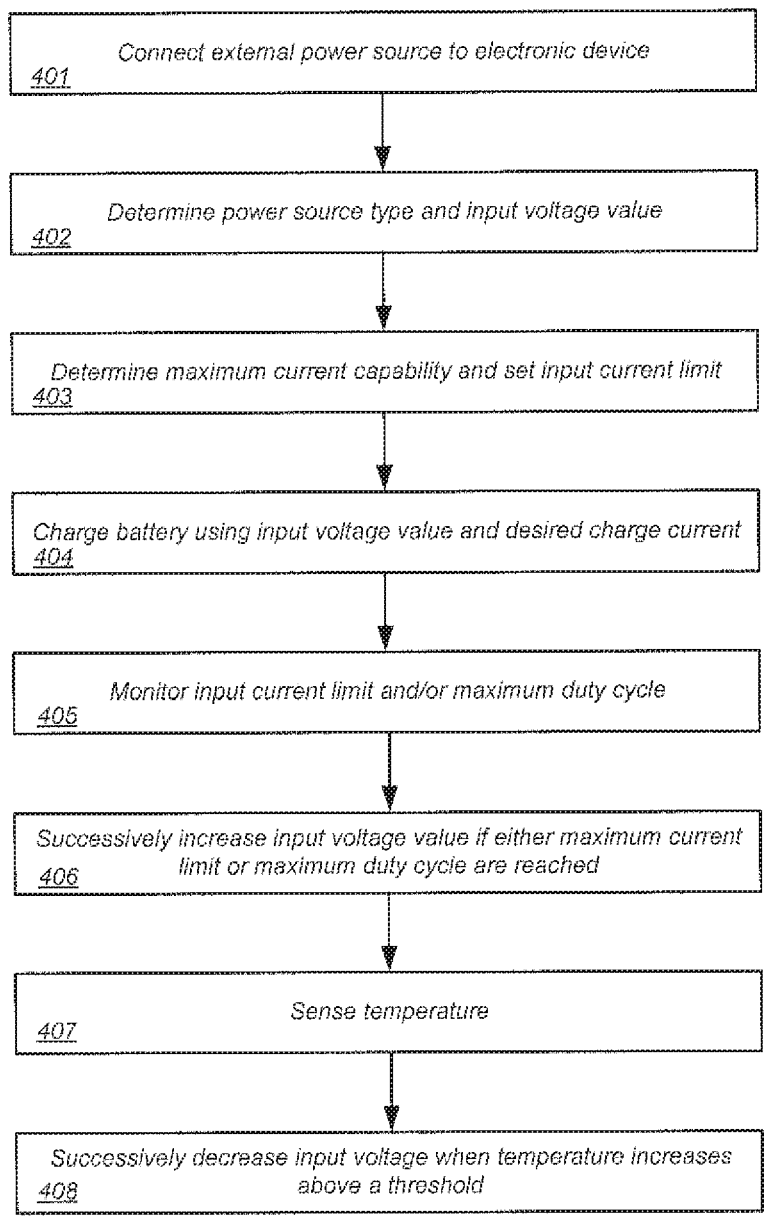
FIG. 4A illustrates a method of charging a battery according to an embodiment.

FIG. 4A illustrates a method of charging a battery according to another embodiment. At 401 an external power source with configurable output voltage is connected to an electronic device. At 402, a battery charging circuit in the electronic device determines the type of power source and the input voltage value. An example of automatic power source detection (APSD) is illustrated below. At 403, the battery charging circuit determines a maximum current capability of the external power source and sets an input current limit. An example of an automatic input current limit (AICL) circuit is illustrated below. At 404, battery charging begins and the battery is charged using the input voltage value. The battery charger may be configured to produce a particular desired battery charge current. At 405, the input current limit and/or duty cycle may be monitored. If the battery charger input current limit is activated or if a maximum duty cycle is reached, then the battery charger may generate control signals to successively increase the input voltage across a plurality of voltage values until the desired charge current is obtained at 406. At 407, the temperature is sensed (e.g., skin and/or die temperature). At 408, if the temperature increases above a threshold temperature, then the battery charger may cause the external power source to decrease the input voltage value. This will reduce power losses in the battery charger IC and subsequently reduce temperature. In some embodiments, the battery charger may generate control signals to successively decrease the input voltage across a plurality of voltage values until the temperature decreases below the threshold temperature.

Different external power sources may have different voltage adjustment capabilities. For example, different voltage values for some external power sources may differ by more than 1 volt (e.g., 5 v, 9 v, and 12 v). Alternatively, other power sources may have very fine voltage resolutions so that different voltage values differ by less than one volt (e.g., 200 mV steps). Accordingly, different embodiments of the present disclosure may detect an external power source type and implement input voltage and input current limit adjustments in different sequences. In one embodiment, a battery charger may decrease the input current limit across a plurality of input current limit values to decrease the temperature below the threshold temperature after generating control signals to decrease the input voltage from the external power source. For power sources with the ability to adjust the input voltage in small steps (e.g., less than 1 volt), it may be advantageous to adjust the input voltage before adjusting the current limit settings. Alternatively, for power sources that have limited voltage adjustment capability (e.g., greater than 1 volt), it may be advantageous to adjust the input current limit settings before adjusting the input voltage. This way, the available input power can be changed in a more continuous manner. Accordingly, in another embodiment, the battery charger may decrease the input current limit across a plurality of input current limit values to decrease the temperature below the threshold temperature before generating control signals to decrease the input voltage from the external power source.

Figure 4B:
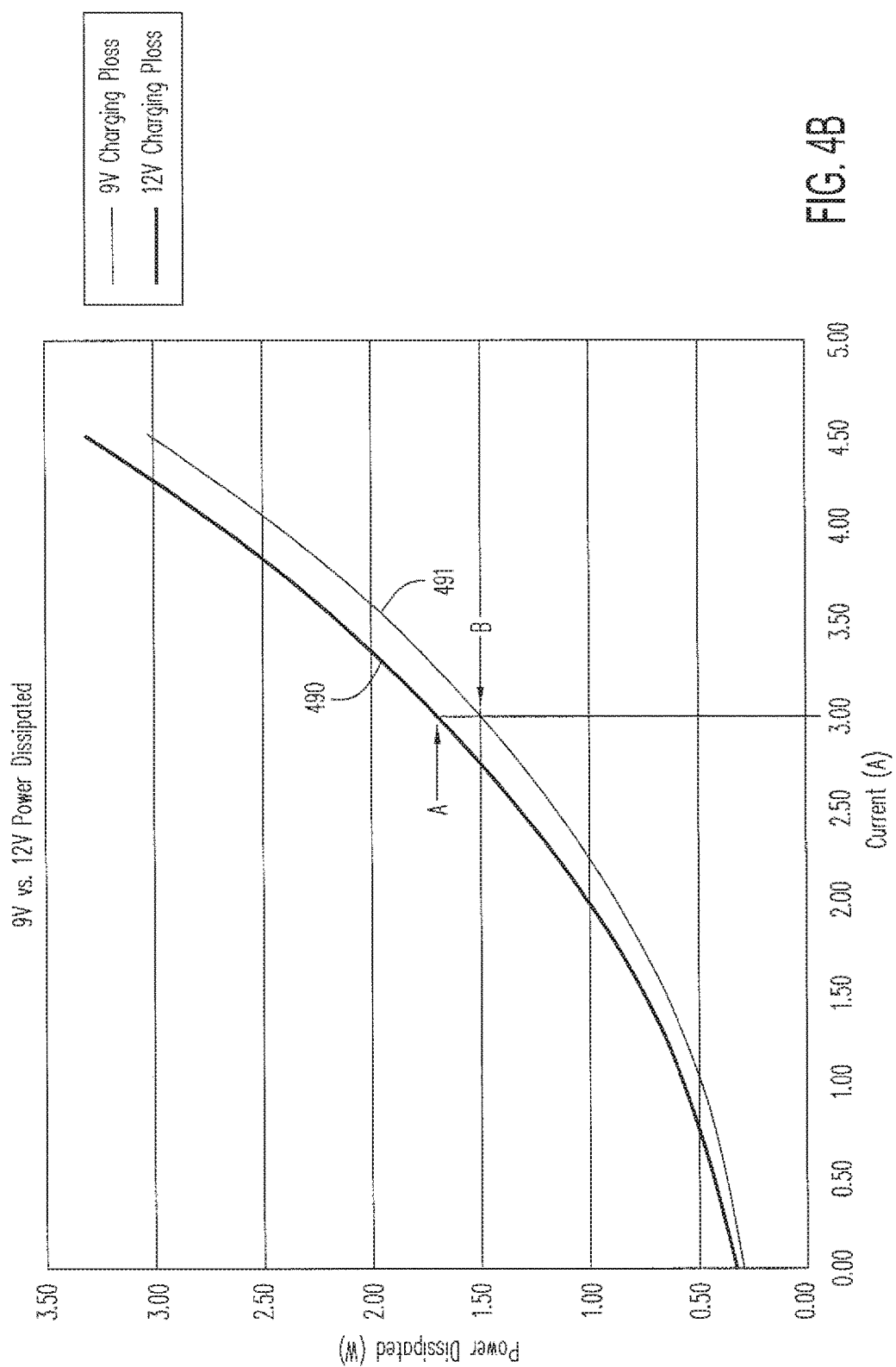
FIG. 4B illustrates an example power dissipation curve.

Features and advantages of the present disclosure further include optimizing charging parameters to reduce power dissipation. FIG. 4B illustrates an example power dissipation curve. One problem created by power sources with variable voltages is that if the voltage is too high, excessive power can be dissipated during the charging process. FIG. 4B illustrates a power dissipation curve for 12 v charging at 490 and 9 v charging at 491 across charge current (in Amps) for a typical DC-DC buck converter charger. It can be seen that there is more power dissipated across all charge currents when charging at 12 v versus 9 v. Accordingly, features and advantages of the present disclosure reduce the input voltage values so that power dissipation is reduced. Furthermore, for external power sources with large output voltage steps (e.g., 5 v, 9 v, and 12 v), embodiments of the present disclosure detect when charging may occur at a lower voltage, and the system reconfigures the voltage and currents so that the system transitions from a first power level at a higher input voltage to a second equivalent power level at a lower input voltage, where the second equivalent power level is equal to the first power level at the higher voltage less the dissipated power caused by use of the higher voltage. For example, a battery charger may be operating at a first higher voltage of 12 v and producing a charge current of 3 A at point A. However, the battery charger may be able to operate at a lower input voltage of 9 v and produce the same charge current of 3 A with a savings of about 250 mW, for example. This savings of 250 mW directly results in a decrease in the skin temperature of the mobile device.

Features and advantages of some embodiments of the disclosure may determine a first power operating point of the charger and reduce the input voltage to a second power operating point below the first power operating point to reduce power dissipation. For example, an initial input voltage value and charge current value may correspond to a first power level at an input of the battery charging circuit. Initially, as described above, if the input current limit is active or if the duty cycle is at a maximum, the input voltage value may be increased to at least one second voltage value (e.g., from 5 v to 9 v). Increasing the first voltage value (e.g., 5 v) to the second voltage value (e.g., 9 v) produces an increase in the charge current to a second current value (e.g., a desired charge current value). The second voltage value and the second current value correspond to a second power level at the input of the battery charging circuit greater than the first power level. As the battery charges, the system may reduce the input power to reduce temperature, for example, and it may be possible to also reduce power dissipation. When the battery charger detects that a lower power level may be used (e.g., by sensing input current at a particular input voltage level), the battery charger may send control signals to the external power source to decrease the input voltage value to a reduced voltage value and produce a third power level at the input of the battery charging circuit that is less than the second power level. The input voltage value may be decreased such that the third power level is approximately equal to the second power level less a difference in dissipated power between the second voltage value (e.g., Point A in FIG. 4B) and the third voltage value (e.g., Point B in FIG. 4B). The point at which this input voltage change occurs may be different depending on the voltages available at the external power source and the available current limit settings, for example.

Figure 5:
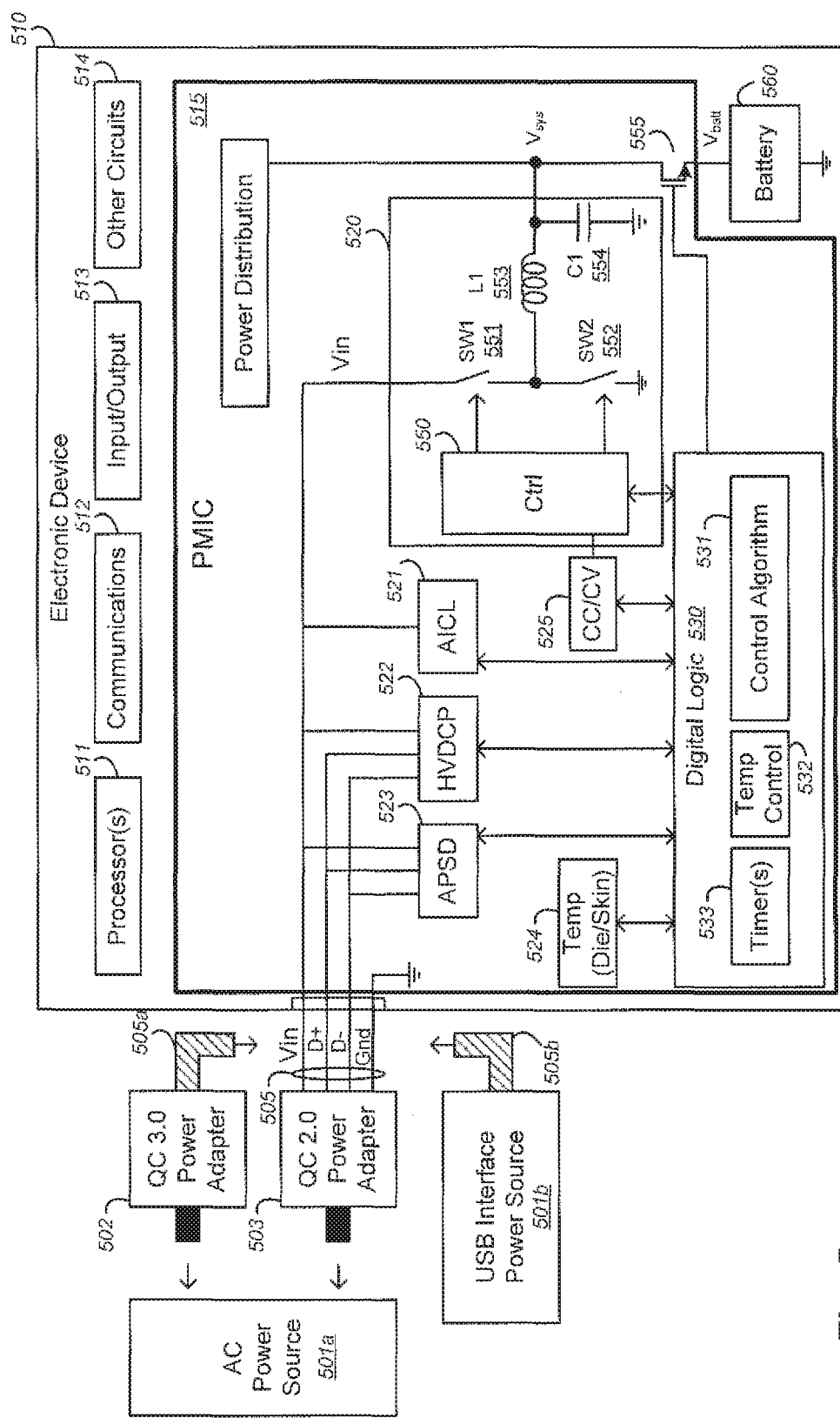
FIG. 5 illustrates an electronic device with a battery charging system according to another embodiment.

FIG. 5 illustrates an example implementation of an electronic device with a battery charging system according to another embodiment. In this example, an electronic device 510 may be coupled to a variety of external power sources 501a and 501b using a USB cable 505. USB cable 505 may include a power supply voltage line Vin, a ground (or return) line Gnd, and data lines D+ and D− for carrying data. Embodiments may further include other lines, such as for communicating dedicated configuration information, for example. In this example, electronic device 510 may be coupled to an AC power source 501a using a Quick Charge 3.0™ power adapter 502 (or equivalent) using cable 505a or a Quick Charge 2.0™ power adapter 503 (or equivalent) using cable 505. AC power adapters convert AC power from the AC power source into DC voltage and current. Additionally, electronic device 510 may be coupled to USB interface power source 501b (e.g., host, hub, etc. . . . ) having a configurable DC voltage using cable 505b. Further, embodiments of the disclosure may be applicable to other USB capable power sources that employ USB Power Delivery.

Electronic device 510 may include a PMIC 515 to provide regulated power supply voltages to one or more processors 511, communications circuits 512, I/O circuits 513, and other circuits as mentioned above. In this example, battery charging circuits are included on PMIC 515, although in other embodiments, battery charging circuits may be on another integrated circuit die, for example. In this example, battery charging circuits include a Buck switching regulator 520 (i.e., Vsys is less than Vin), an automatic input current limit (AICL) circuit 521, a high voltage dedicated charge port (HVDCP) detection circuit 522, automatic power source detection (APSD) circuit 523, temperature detection circuits 524, and controlled current/controlled voltage (CC/CV) regulation circuit 525.

Switching regulator circuit 520 includes a high side switch 551 and low side switch 552, which may both be MOS transistors, inductor 553, output capacitor 554, and control circuitry 550, which may include pulse width modulation circuits and gate driver circuits to turn switches 551 and 552 ON and OFF, for example. An output of the switching regulator produces a system voltage Vsys, which may be coupled to battery 560 through switch transistor 555 during battery charging and coupled to a power distribution circuit to produce regulated voltages for other system circuit blocks. Battery 560 produces voltage Vbatt, which may be coupled through transistor 555 to provide the system voltage when an external source is not connected, for example.

AICL circuit 521 may be used to determine a maximum current capability of an external power source. One example circuit for performing automatic input current limiting (AICL) is disclosed in U.S. Pat. No. 7,990,106 the content of which is hereby incorporated herein by reference. APSD circuit 523 may be used to determine a type of external power source, for example. One example circuit for performing automatic power source detection (APSD) is disclosed in U.S. Patent Publication No. 20120217935 the content of which is hereby incorporated herein by reference. HVDCP circuit 522 may be used to control an external power source to produce different voltages. One example circuit for controlling a high voltage dedicated charge port (HVDCP) is disclosed in U.S. Patent Publication No. 20140122909 the content of which is hereby incorporated herein by reference. Controlled current/controlled voltage (CC/CV) circuit 525 may configure the switching regulator to operate in one or more current control modes (e.g., constant pre-charge current or fast charge current) and a voltage control mode (e.g., constant "float" voltage charging). One example circuit for performing controlled voltage and controlled current charging is disclosed in U.S. Pat. No. 7,880,445 the content of which is hereby incorporated herein by reference. Temperature detection circuits 524 may include analog to digital converters (ADC) or comparators to receive digital or analog temperature sensor signals, respectively, and either translate the digital temperature sensor signals into temperature data or compare the analog temperature sensor signals against reference values to determine if a temperature is above or below one or more thresholds, for example. In one example embodiment, a temperature sensor may comprise a diode-connected bipolar junction transistor (BJT) or a thermistor.

In this example, optimized charging may be implemented using digital logic 530 in communication with the above mentioned components. Here, a control algorithm 531 for charging the battery is implemented as part of digital logic 530. However, it is to be understood that other embodiments may implement the methods and techniques described herein using an algorithm operating on a processor in communication with herein described circuit components and configured with software to perform the techniques described herein. For example, referring to FIG. 2, some embodiments may include a processor configured with computer executable code, where hardware sensors, detectors, and/or monitor circuits trigger interrupts that may be used by the executable software code to generate the control signals to adapter output voltage. For example, an activated input current limit or the maximum duty cycle may trigger one or more interrupts that cause the processor to generate the control signals for changing the adapter voltage received by an electronic device for charging a battery. In the example shown in FIG. 5, digital logic 530 may further include timers 533 and temperature control 532. Digital logic 530 may receive temperature information from temperature detection circuits 524. Digital logic 530 may include logic for supporting the APSD circuits, AICL circuits, and HVDCP circuits, for example. An example implementation of digital logic 530 is presented below. In this example, the digital logic is shown as residing on the same integrated circuit as the battery charging hardware (i.e., on the PMIC), but in other embodiments, the digital logic may reside on a different integrated circuit than the battery charging hardware.

Figure 6:
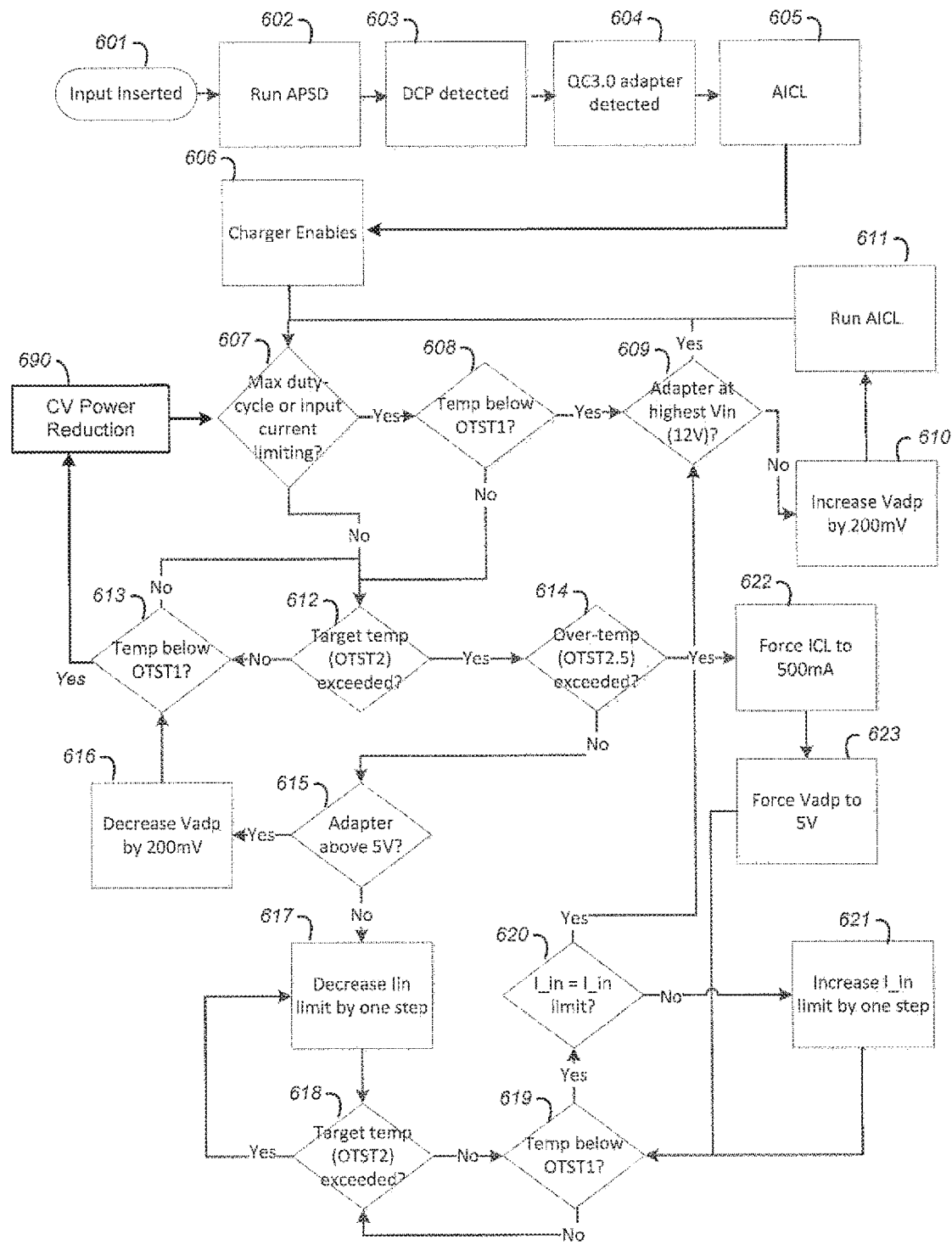
FIG. 6 illustrates an example method of charging a battery according to an embodiment.

FIG. 6 illustrates an example method of charging a battery according to an embodiment. At 601, a cable from an external power source may be inserted into a cable input of an electronic device. At 602, an automatic power source detection procedure is run. At 603, a dedicated charge port (DCP), such as a wall adapter, is detected. At 604, the adapter type is detected. In this example, the detected adapter type is a Quick Charge 3.0™ adapter. At 605, automatic input current limit process is performed to determine the maximum charge current available from the charger and set a current limit in the charger. For example, if the adapter maximum output current is less than a maximum possible input current to charge the battery, the system may set a current limit so the input current does not exceed that maximum output current from the adapter. At 606, the charger is enabled and battery charging begins.

As mentioned above, some example embodiments may monitor duty cycle and current limit and successively increase the power supply voltage to the battery charger until a desired battery charge current is obtained. If a maximum duty cycle is detected, or if input current limiting is activated, at 607, then the system may perform an initial thermal check at 608. If the temperature (e.g., of the die or case) is below a threshold temperature, OTST1, then the system may determine if the voltage can be increased at 609. If the adapter is at its' highest voltage (e.g., 12 v), then the process returns to 607. However, if the adapter is below 12 v, then the adapter voltage, Vadp, is increased at 610. In some embodiments, it may be advantageous to run the AICL process after each voltage adjustment to make sure that the adapter's power output is not decreasing as its output voltage increase. Accordingly, in this example, AICL is run at 611, and the maximum duty cycle and input current limit is checked again at 607.

Features and advantages of the present disclosure include monitoring temperature and adjusting input voltage and/or an input current limit to maintain the temperature below a threshold or within a window. In this example, if the duty cycle is not at a maximum and the input current limit is not active at 607 (or if the temperature is above threshold OTST1 at 608), the system may enter a process where the temperature inside the electronic device is sensed and control signals are generated to decrease the value of the input voltage when the temperature increases above a threshold temperature, OTST2, for example. In this example implementation, the system determines if the temperature exceeds a threshold temperature, OTST2, at 612. If the temperature is below OTST2, then the system determines if the temperature is below another threshold at 612, which in this example is OTST1. If the system is below OTST2 and above OTST1 (e.g., within a "temperature range" or "temperature window"), then charging continues at the existing charge current and adapter voltage, Vadp. However, if the temperature exceeds OTST2, then the system may successively decrease the adapter voltage, Vadp. In this example, the temperature is first compared against a maximum "over-temperature" limit at 614. If the temperature is above this limit, then the input current limit is decreased at 622 to a predetermined safe input current limit (here, to 500 mA) and the input voltage, Vadp, is decreased at 623 to a predetermined safe input voltage (here, to 5 v). However, if the temperature is below the over-temperature limit at 614, then the adapter voltage is successively decreased at 616 unless it is at a minimum power source voltage, which in this example is 5 v. In this example, Vadp may be decreased in 200 mV steps, and the system may proceed through steps 613, 612, 614, 615, and 616 until the temperature is below OTST2, for example.

The present example may reduce the input voltage value of Vadp before reducing the input current limit. For example, because Vadp is adjustable in 200 mV steps, it may be advantageous to reduce Vadp before the current limit to reduce dissipated power while still providing the desired charge current. This is because the DC-DC converter in the battery charger will incur higher switching losses at higher input voltage levels. Here, when Vadp is 5 v, as determined at 615, the system may start reducing the input current limit at 617 until the temperature is below OTST2, as determined at 618, for example. Once Vadp is at 5 v and the input current limit has been reduced, the system may continue charging as long as the temperature is within a temperature range (or window) below OTST2 and above OTST1. If the temperature falls below OTST1 while the system is at a minimum power supply input voltage of 5 v, then the system may determine if the input current is at the input current limit at 620, and if so, then increase the input current limit at 621 (e.g., successively until the temperature increases above OTST1). If the input current is less than the input current limit at 620, then the system may increase Vadp at 609, for example, until the maximum duty cycle or input current limit are reached. When Vadp and the input current are such that the maximum duty cycle and input current limit are not triggered, and when the temperature is below OTST1 (the lower thermal threshold) at 613, the system may enter a mode where constant voltage is detected and power is reduced at 690. The process performed at 690 is described in more detail below with reference to FIGS. 9A and 9B, for example.

Figure 7A:
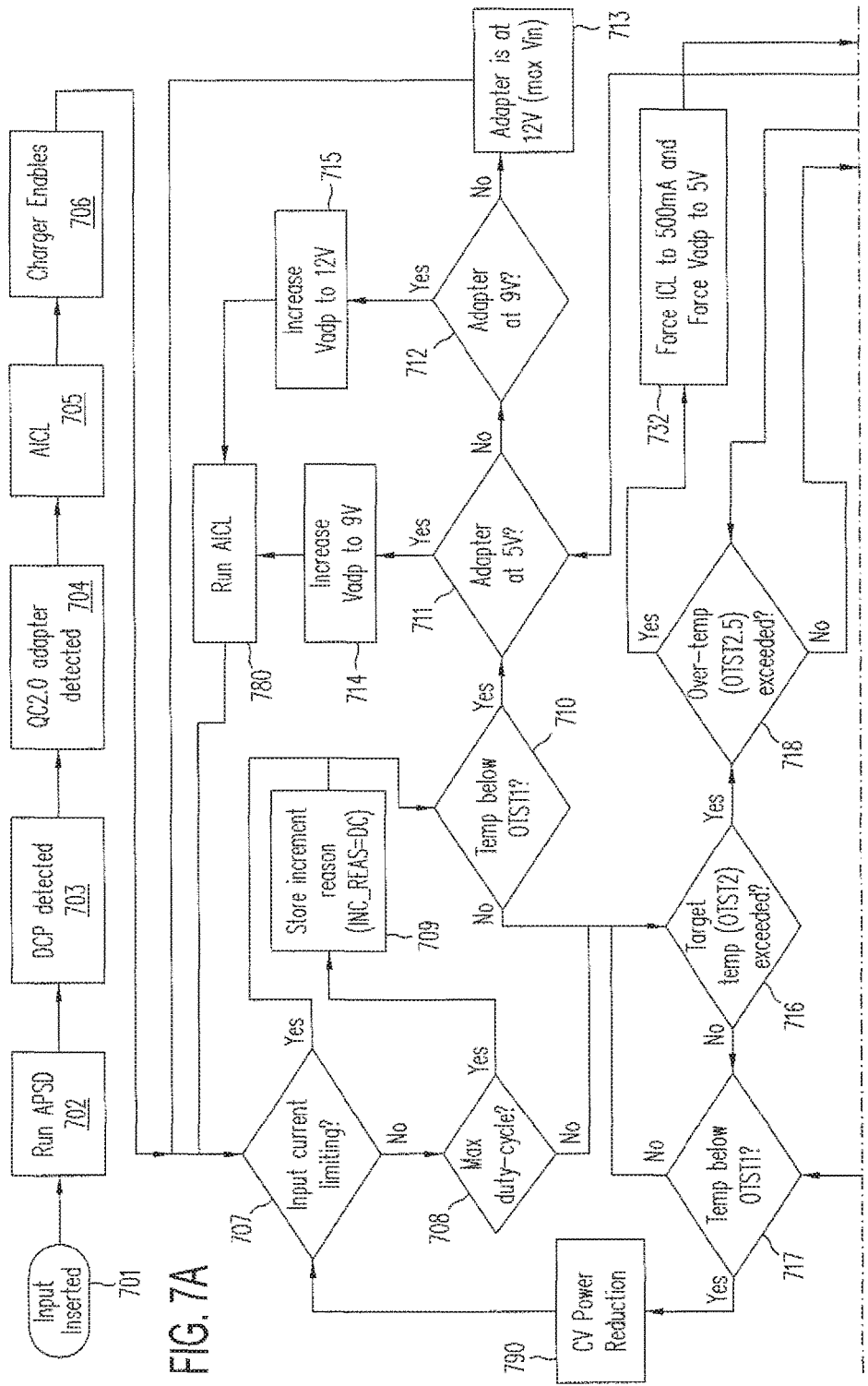
FIG. 7 (consisting of FIG. 7A and FIG. 7B) illustrates an example method of charging a battery according to another embodiment.
Figures 7, 7A, 7B:
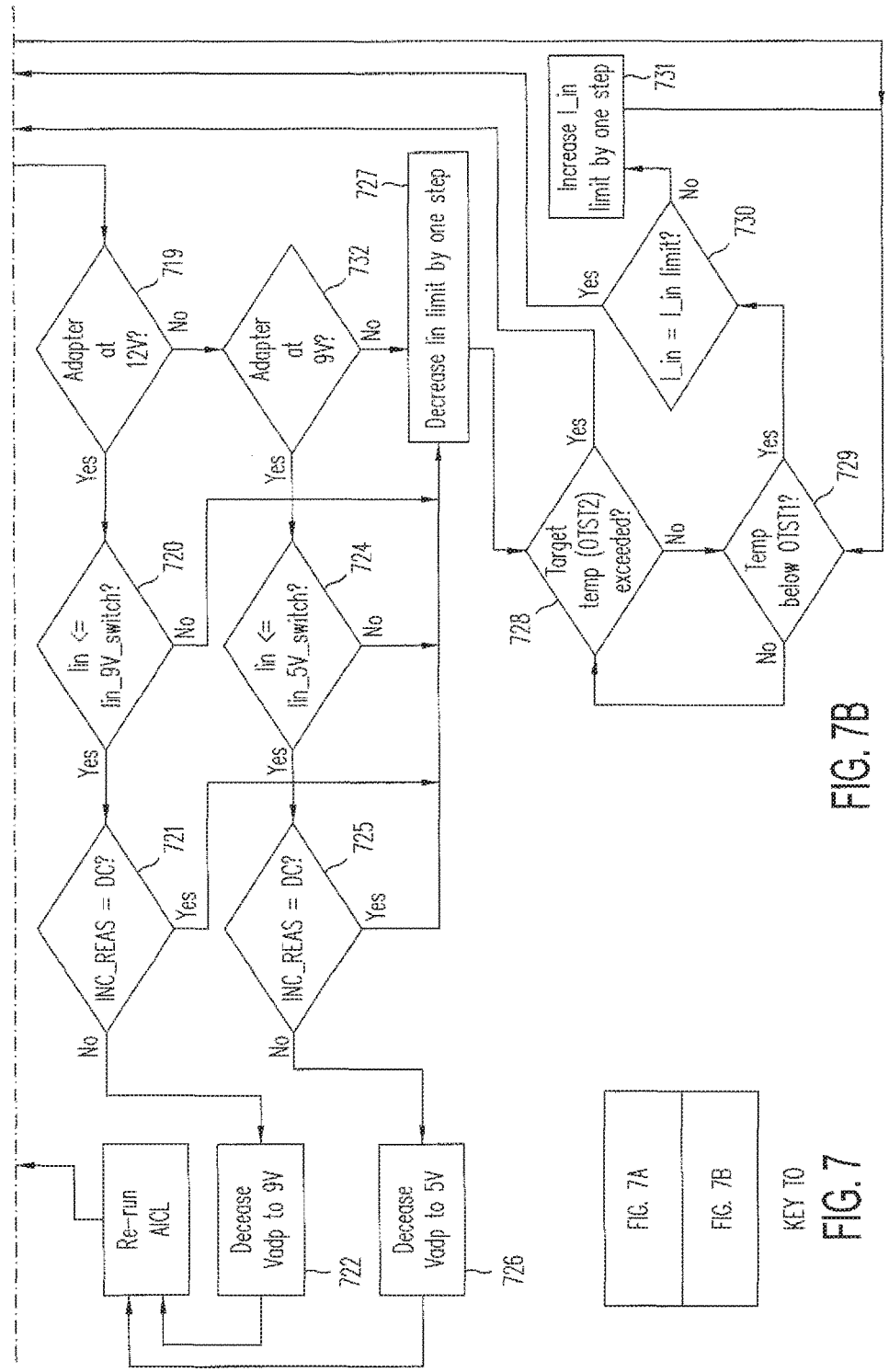

FIG. 7 illustrates another example method of charging a battery according to another embodiment. Similar to FIG. 6, steps 701-706 are similar to steps 601-606 except in this example a Quick Charge 2.0™ adapter is detected. Such an adapter may be configured to produce discrete voltages of 5 v, 9 v, and 12 v, for example. One problem with differences between the input voltages to the charger is that the system may dissipate more power at higher voltages, which may be necessary to produce desired charge currents. One challenge with external sources having large voltage differences between settings is optimally configuring the system to produce a desired charge current into the battery with minimum power dissipation losses. In this example, the system may separately determine if the input current limit is active at 707 and whether the maximum duty cycle has been reached at 708. If the input current limit has been reached at 707, the system may send control signals to reduce the voltage value from the adapter, Vadp. In this example, if the maximum duty cycle has been reached at 708, the system may advantageously set a flag indicating the reason why the input voltage was incremented at 709 (e.g., INC_REAS=DC; i.e., the input voltage Vadp was increased because the duty cycle was at a maximum). Similar to the example in FIG. 6, the system may determine if the temperature is below threshold OTST1 at 710, and if so successively increase Vadp at steps 711-715 and run AICL at 780. Once the input voltage Vadp is set so that the system is not at maximum duty cycle and not input current limiting, charging continues as long as the temperature remains within a range set by OTST1 and OTST2. If the temperature exceeds threshold OTST2, then the maximum temperature, Tmax, is checked at 718 (at input current limit and Vadp reduced at 732 as in FIG. 6 if above Tmax).

The present example implementation illustrates another advantage of some embodiments. In this example, the input current limit is decreased across a plurality of input current limit values to decrease the temperature before the decreasing the value of Vadp. For instance, at 719 and 732 the system determines if Vadp can be decreased (e.g., if it is at either 12 v or 9 v). If Vadp is at a maximum voltage (e.g., 12 v) at 719, for example, the input current, Iin, is compared to a first input current threshold (e.g., Iin_9 v_switch) at 720. If the input current is greater than the first input current threshold, then the system may reduce the input current limit at 727. If the temperature remains above OTST2 at 728, then the system repeats steps 718, 719, and 720 until the input current is below the first input current threshold. When the input current is equal to the first input current threshold, Iin_9 v_switch, the adapter voltage may be decreased to the next step. Advantageously, the first input current threshold, Iin_9 v_switch, corresponds to an input power level at a first value of Vadp (e.g., 12 v) where there is an equivalent input power level at a second value of Vadp (e.g., 9 v) that produces the desired battery charge current. However, the equivalent input power level may be lower than the previous input power level because there is less power dissipation in the charger. Accordingly, Vadp may be decreased such that a new input power level (or final input power, Pi_final) at the lower value of Vadp is approximately equal to the previous input power level (or initial input power, Pi_init) at a higher value of Vadp less (i.e., minus) a difference in dissipated power (e.g., Pi_init=Pi_final−Pdiss). The power dissipation eliminated by transitioning to a lower value of Vadp can be seen in FIG. 4B. The above described example senses the input current and may compare the input current to one or more thresholds to trigger the transition to decrease Vadp, for example. Referring again to FIG. 7, if Iin is less than or equal to current threshold Iin_9 v_switch, then the system may check the flag INC_REAS (described above). If the duty cycle was the cause of the increase in Vadp at 714-715, then Vadp is decreased at 722. If the duty cycle was not the cause of the increase in Vadp at 714-715, then the input current limit is decreased further. Advantageously, independently determining that the battery charger is at a maximum duty cycle and the current limit is not activated (e.g., and setting flag INC_REAS) allows the system to distinguish between situations where current through the cable is causing a voltage drop (i.e., Vadp is sufficiently high for charging but the current is too high) versus situations where Vadp is not high enough to achieve the desired charge current for a given adapter output current. In the present example, if the duty cycle was the cause of the increase in Vadp (INC_REAS=DC), then the current from the adapter is decreased at 727 by decreasing the input current limit. If the temperature remains above OTST2 (at either 716 or 728), then the system returns to 719 to decrease the input current limit and/or Vadp until the temperature is within the temperature window above OTST1 and below OTST2, for example.

Figure 8A:
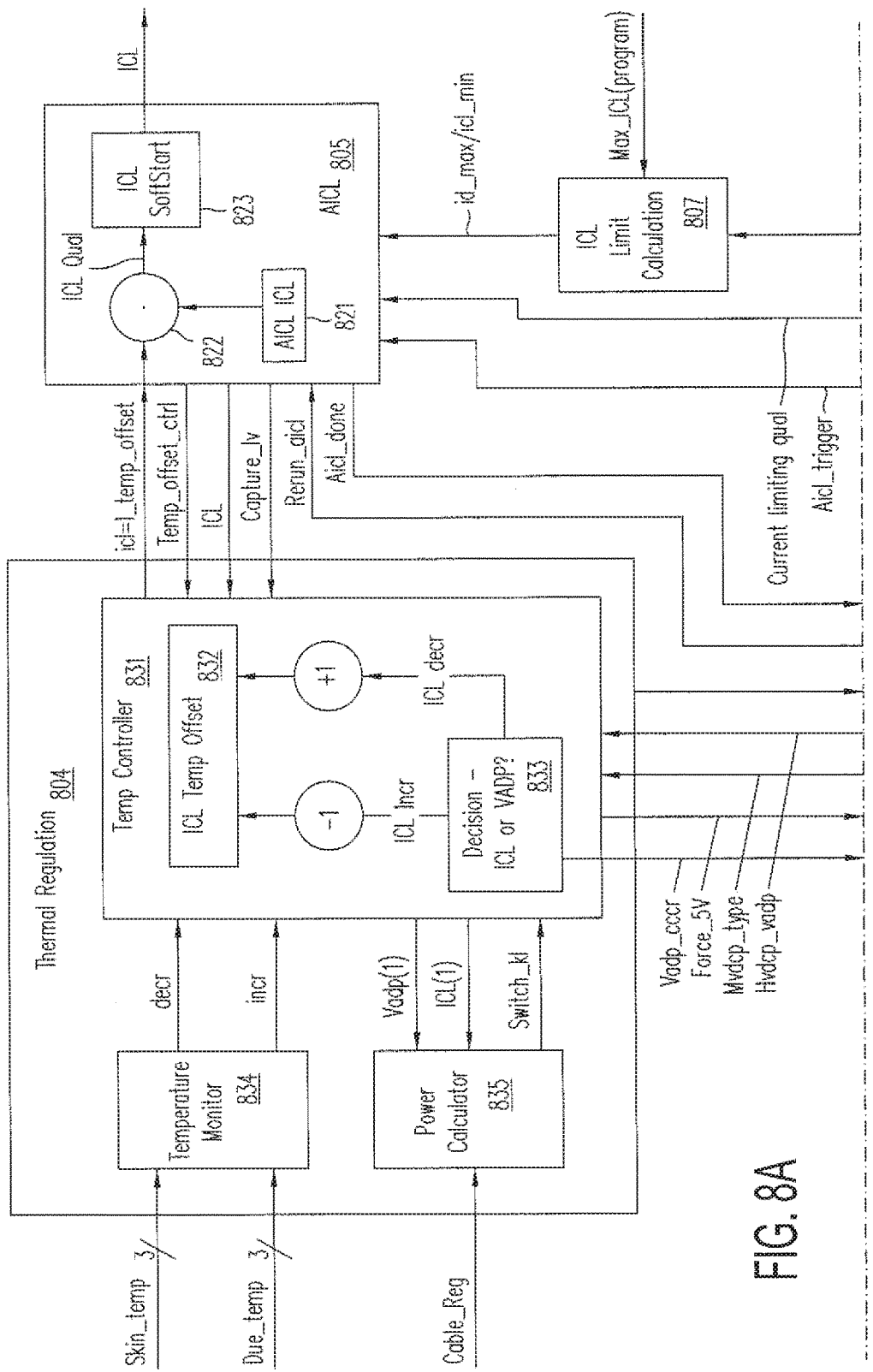
FIG. 8 (consisting of FIG. 8A and FIG. 8B) illustrates a block diagram of a circuit to control battery charging according to an embodiment.

FIG. 8 illustrates a block diagram of a circuit to control battery charging according to an embodiment. FIG. 8 is one example of digital logic that may implement the algorithms in FIGS. 6 and 7, for example. While the present example is implemented in digital logic, it is to be understood that the disclosed techniques may be implemented in analog circuits or on a digital processor, for example. In this example, digital control circuits may include an APSD control circuit 802, HVDCP control circuit 803, thermal regulation control circuit 804, AICL control circuit 805, trigger control circuit 806, input current limit calculator 807, and timer 808.

APSD control circuit 802 may interface with external power source 801 to detect the external power source. HVDCP control circuit 803 may generate control signals to increase and/or decrease a voltage value of an input voltage from external power source 801. In this example, HVDCP includes an APSD interface 811 to produce a control signal Vadp_change, which causes APSD control circuit 802 to generate control signals to negotiate a change in the external power source voltage. HVDCP control circuit 803 may include a VADP increase processor 812 to monitor an input current limit active signal (Current Limiting Qual) and a maximum duty cycle signal (Max Duty Cycle Qual) to trigger changes in Vadp, for example.

AICL control circuit 805 may perform AICL functions, which may include setting an input current limit in response to temperature control signals from thermal regulation control circuit 804, trigger signals from trigger circuit 806, and max/min ICL signal from ICL limit calculation circuit 807. AICL control circuit 805 may include a temperature offset circuit 822 for offsetting an input current limit determined by AICL ICL circuit 821.

Trigger control circuit 806 is one example circuit for monitoring an input current limit and a duty cycle of the battery charging circuit. Trigger circuit 806 receives digital signals indicating a max duty cycle is reached, input current limit is active (e.g., the input current meets the set input current limit), and input collapse signal indicating if the voltage at the input has dropped out.

Thermal regulation control circuit 804 is one example circuit that receives signals indicating a temperature inside the electronic device. In this example, thermal regulation control circuit receives 3 bits for skin temperature (e.g., from an external temperature sensor and an external or internal analog to digital converter) and 3 bits for die temperature in temperature monitor circuit 834. Temperature monitor circuit 834 may monitor the temperature and generate increase/decrease signals to temp controller 831. Temp controller 831 may determine whether to change the input current limit, ICL, or input voltage, Vadp, (as described above) using decision circuit 833 and produce ICL increment signal and ICL decrement signal (e.g., to ICL temp offset circuit 832) and adapter decrement signal (e.g., to APSD interface 811). Decision circuit 833 may control whether the input voltage is decreased before or after the current limit is reduced, as described above. Accordingly, decision circuit 833 may receive one or more inputs from a power calculator circuit 835 which receives a cable resistance, input voltage signal, and ICL signal to determine when to change the input current limit versus the input voltage, for example. Timer circuits 808 may include one or more timers, which may be used to implement a constant voltage power reduction algorithm, which will now be described.

Figure 9A:
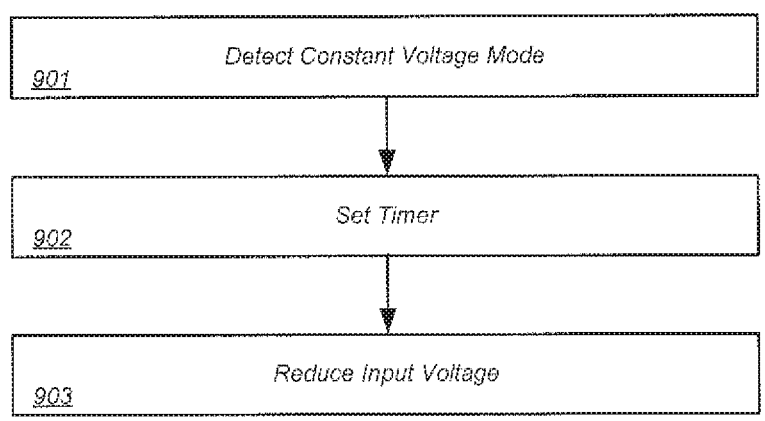
FIG. 9A illustrates a method of charging a battery during controlled voltage mode according to an embodiment.

FIG. 9A illustrates a method of charging a battery during constant voltage (CV) mode according to an embodiment. During CV charging, charge current gradually reduces as the battery cell voltage increases to the battery pack voltage. Accordingly, as the charge current decreases efficiency may be improved by reducing the charger input voltage. As mentioned above, embodiments of the present disclosure may reduce adapter power during constant voltage charging. For example, in one embodiment, the system may detect when the temperature is below a threshold temperature (e.g., a lower threshold of a temperature window). Reductions in temperature may be observed when the system transitions from controlled current charging to controlled (or constant) voltage charging, for example. In one embodiment, a method includes detecting a constant voltage mode at 901 (e.g., when the temperature falls below OTST1 in FIGS. 6 and 7). At 902 a timer is set and the system may wait a predefined period of time. At 903 control signals are generated to decrease a present value of the input voltage.

Figure 9B:
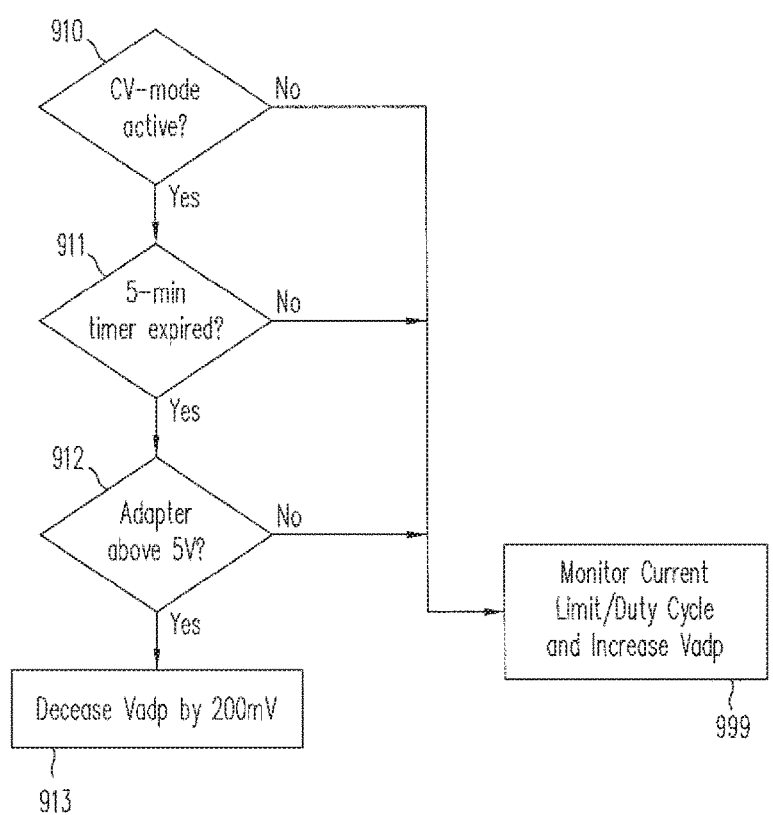
FIG. 9B illustrates a method of charging a battery during controlled voltage mode according to another embodiment.

FIG. 9B illustrates another example method to reduce power during constant voltage charging. At 910 the system determines if constant voltage mode is active. At 911 a 5 minute timer is checked (e.g., the system waits 5 min if CV charging is active). At 912 the system detects if the input voltage is above a minimum value (e.g., 5 v), and if so, the system decreases the input voltage (e.g., Vadp is reduced by 200 mV) at 913. Subsequently, the timer will be reset and upon each additional expiration, the adapter voltage will be decremented. If any of the above steps are not applicable, then the system may return to current limit and duty cycle monitoring and may increase Vadp as described above (e.g., Vadp may be increased again after the temperature falls below threshold OTST1).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit to control battery charging, comprising:
a power source detection circuit configured to interface with a programmable power source;
a charge port circuit coupled to the power source detection circuit, the charge port circuit configured to provide a control signal to the power source detection circuit to increase or decrease voltage from the programmable power source;
a thermal regulation circuit coupled to the charge port circuit, wherein the thermal regulation circuit comprises
a temperature monitor coupled to receive one or more temperature signals, the temperature monitor providing temperature increase or decrease signals, and
a temperature controller coupled to receive the temperature increase or decrease signals from the temperature monitor, the temperature controller configured to provide signals indicating a change in an input current limit or a voltage; and
an input current limit circuit coupled to the charge port circuit,
wherein the charge port circuit is configured to provide the control signal to the power source detection circuit to increase or decrease the voltage in response to signals from the thermal regulation circuit and the input current limit circuit.

2. The circuit of claim 1, wherein the charge port circuit comprises
a power source detection circuit interface coupled to provide the control signals to the power source detection circuit; and
a processor coupled to the power source detection circuit interface that is configured to monitor an input current limit active signal and a maximum duty cycle signal and provide an indication to the power source detection circuit interface to produce the control signal to the power source detection circuit.

3. The circuit of claim 1, further including
an input current limit calculator coupled to the power source detection circuit, the input current limit calculator providing a current limit range to the input current limit circuit in response to a type of programmable power supply received from the power source detection circuit.

4. The circuit of claim 1, further including
a trigger control circuit coupled to the charge port circuit, the trigger control circuit configured to monitor an input current limit and a duty cycle of a battery charging circuit and provide trigger signals to the charge port circuit in response to reaching a maximum duty cycle or determining an input current limit is active.

5. The circuit of claim 1, further including
a power calculator coupled to receive a cable resistance, an input voltage signal, and an input current limit (ICL) signal, and
wherein the temperature controller includes a decision circuit that is configured to receive a decision signal from the power calculator and control whether to produce an ICL increment/decrement signal or a voltage increment/decrement signal to the input current limit circuit.

6. The circuit of claim 1, further including a timer coupled to the charge port circuit, the timer configured to provide a timing signal to the charge port circuit.

7. The circuit of claim 6, wherein the charge port circuit is configured to receive the timing signal and provide signals to the power source detection circuit to implement a gradual reduction in the voltage from the programmable power supply.

8. The circuit of claim 7, wherein the voltage is reduced as a charging current is reduced.

9. The circuit of claim 7, wherein the voltage is reduced at timed intervals.

10. A circuit to control battery charging, comprising:
a power source detection circuit configured to interface with a programmable power source;
a charge port circuit coupled to the power source detection circuit, the charge port circuit configured to provide a control signal to the power source detection circuit to increase or decrease voltage from the programmable power source;
a thermal regulation circuit coupled to the charge port circuit;
an input current limit circuit coupled to the charge port circuit; and
a trigger control circuit coupled to the charge port circuit,
wherein the charge port circuit is configured to provide the control signal to the power source detection circuit to increase or decrease the voltage in response to signals from the thermal regulation circuit and the input current limit circuit, and
the trigger control circuit configured to monitor an input current limit and a duty cycle of a battery charging circuit and provide trigger signals to the charge port circuit in response to reaching a maximum duty cycle or determining an input current limit is active.

11. The circuit of claim 10, further including
an input current limit calculator coupled to the power source detection circuit, the input current limit calculator providing a current limit range to the input current limit circuit in response to a type of programmable power supply received from the power source detection circuit.

12. The circuit of claim 10, wherein the thermal regulation circuit comprises
a temperature monitor coupled to receive one or more temperature signals, the temperature monitor providing temperature increase or decrease signals; and
a temperature controller coupled to receive the temperature increase or decrease signals from the temperature monitor, the temperature controller configured to provide signals indicating a change in an input current limit or a voltage.

13. The circuit of claim 12, further including
a power calculator coupled to receive a cable resistance, an input voltage signal, and an input current limit (ICL) signal, and
wherein the temperature controller includes a decision circuit that is configured to receive a decision signal from the power calculator and control whether to produce an ICL increment/decrement signal or a voltage increment/decrement signal to the input current limit circuit.

14. The circuit of claim 10, further including a timer coupled to the charge port circuit, the timer configured to provide a timing signal to the charge port circuit.

15. A circuit to control battery charging, comprising:
a power source detection circuit configured to interface with a programmable power source;
a charge port circuit coupled to the power source detection circuit, the charge port circuit configured to provide a control signal to the power source detection circuit to increase or decrease voltage from the programmable power source;
a thermal regulation circuit coupled to the charge port circuit;
an input current limit circuit coupled to the charge port circuit; and
a timer coupled to the charge port circuit, the timer configured to provide a timing signal to the charge port circuit,
wherein the charge port circuit is configured to provide the control signal to the power source detection circuit to increase or decrease the voltage in response to signals from the thermal regulation circuit and the input current limit circuit.

16. The circuit of claim 15, wherein the charge port circuit comprises
a power source detection circuit interface coupled to provide the control signals to the power source detection circuit; and
a processor coupled to the power source detection circuit interface that is configured to monitor an input current limit active signal and a maximum duty cycle signal and provide an indication to the power source detection circuit interface to produce the control signal to the power source detection circuit.

17. A circuit to control battery charging, comprising:
a power source detection circuit configured to interface with a programmable power source;
a charge port circuit coupled to the power source detection circuit, the charge port circuit configured to provide a control signal to the power source detection circuit to increase or decrease voltage from the programmable power source;
a thermal regulation circuit coupled to the charge port circuit;
an input current limit circuit coupled to the charge port circuit; and
an input current limit calculator coupled to the power source detection circuit, the input current limit calculator providing a current limit range to the input current limit circuit in response to a type of programmable power supply received from the power source detection circuit,
wherein the charge port circuit is configured to provide the control signal to the power source detection circuit to increase or decrease the voltage in response to signals from the thermal regulation circuit and the input current limit circuit.

* * * * *